(12) United States Patent
Ichimura et al.

(10) Patent No.: US 7,667,853 B2
(45) Date of Patent: Feb. 23, 2010

(54) QUANTUM BIT READING DEVICE AND METHOD

(75) Inventors: Kouichi Ichimura, Yokohama (JP); Hayato Goto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 148 days.

(21) Appl. No.: 12/046,161

(22) Filed: Mar. 11, 2008

(65) Prior Publication Data
US 2008/0231837 A1    Sep. 25, 2008

(30) Foreign Application Priority Data
Mar. 19, 2007    (JP) ............................. 2007-071087

(51) Int. Cl.
*G01B 9/02* (2006.01)
(52) U.S. Cl. ...................... 356/519; 356/450
(58) Field of Classification Search ................ 356/450, 356/519
See application file for complete search history.

(56) References Cited

U.S. PATENT DOCUMENTS

| | | | | |
|---|---|---|---|---|
| 7,126,106 | B2 * | 10/2006 | Goto et al. ................. | 250/225 |
| 7,230,266 | B2 * | 6/2007 | Hilton et al. ................ | 257/31 |
| 7,437,533 | B2 * | 10/2008 | Ichimura et al. .............. | 712/1 |

OTHER PUBLICATIONS

A. Boca, et al, "Observation of the Vacuum Rabi Spectrum for One Trapped Atom", Physical Review Letters, PRL 93, 233603, Dec. 3, 2004, pp. 233603-1-233603-4.
H. J. Carmichael, et al. "Cavity Quantum Electrodynamics", edited by P.R. Berman, Academic Press. Inc., 1994, pp. 396-399.
J. Gripp, et al, "Evolution of the Vacuum Rabi Peaks in a Detuned Atom-Cavity System", Physical Review A, vol. 56, No. 4, Oct. 1997, pp. 3262-3273.

* cited by examiner

*Primary Examiner*—Tarifur Chowdhury
*Assistant Examiner*—Jonathon D Cook
(74) *Attorney, Agent, or Firm*—Oblon, Spivak, McClelland, Maier & Neustadt, L.L.P.

(57) ABSTRACT

An apparatus includes a material in a resonator and containing systems, each of the systems having five energy states, a unit generating first and second pulse that resonate in a second transition and a third transition, respectively, a unit controlling the first and second pulse to make the first and second pulse temporally overlap each other to obtain third light, a unit emitting the third light to each system, a unit generating observation light to be coupled to the resonator mode, a unit introducing the observation light to the resonator from an outside thereof, a unit reading one of quantum bits by measuring an intensity of one of reflected light and transmitted light of the observation light, a unit controlling the first and second pulse to make the first and second pulse temporally overlap each other to obtain fourth light, and a unit emitting the fourth light to each system.

12 Claims, 6 Drawing Sheets

QUANTUM BIT READING DEVICE AND METHOD

CROSS-REFERENCE TO RELATED APPLICATIONS

This application is based upon and claims the benefit of priority from prior Japanese Patent Application No. 2007-071087, filed Mar. 19, 2007, the entire contents of which are incorporated herein by reference.

BACKGROUND OF THE INVENTION

1. Field of the Invention

The present invention relates to a quantum bit reading device and method, in which a plurality of quantum bits, each of which comprises a single physical system and exists in a double-sided resonator, are individually read by detecting a significant change in the intensity of sufficiently intensified light, utilizing the phenomenon that the intensities of light beams reflected from and transmitted through a coupled system formed of the resonator mode of the resonators and each physical system (single atom, ion, etc.) are significantly changed in accordance with the state of each physical system, regardless of whether the intensity of incident light is high or less.

2. Description of the Related Art

Each result of quantum computation is expressed as the state of a quantum bit that comprises, in most cases, a single atom, ion or photon (in this specification, both the quantum state of a physical system, and the physical system itself is called a quantum bit), therefore it is necessary to read the state of the single physical system. In the case of a quantum bit coupled to light, a method is effective and practical, in which when light is applied to a to-be-read quantum bit, it is observed whether a photon is emitted from the quantum bit in accordance with whether the quantum bit is excited by the light. At this time, if the physical system is a magnetically trapped gas of an ions or atom, a strict selection rule is utilized to cause a transition for relaxing the excited state of each physical system only to the original state, excitation and relaxation can be repeated an arbitrary number of times in accordance with the states of quantum bits, thereby causing a large number of photons to be emitted.

However, in the case of a quantum bit in a solid, such as the nuclear spin of an ion in crystal, since the angular momentum and spin of an energy state are mixed up as a result of various interactions, and hence there is no strict selection rule, it is determined only in a probabilistic manner into which metastable state the quantum bit is relaxed after it is once excited. Accordingly, it is necessary to accurately detect a single photon for reading. It is possible to reduce the probability of failure in photon detection, if the operation of reliably shifting and returning the state of a quantum bit to and from a level that resonates with the resonator mode, using adiabatic passage, is repeated, thereby limiting the space mode in which a photon is emitted, and providing a plurality of chances for photon detection. However, also in this case, it is necessary to detect a single photon.

Recently, observation of vacuum Rabi splitting (also called normal-mode splitting) of a single atom in a resonator, utilizing weak light and photon counting has been reported (see, for example, Phys. Rev. Lett. 93, 233603 (2004)). Further, it has been proposed to realize a quantum gate between a photon and atom, or between atoms (via a photon), utilizing variations in the phase of a reflected photon due to variations in the state of the atom(s), when a single photon is introduced to a coupled system formed of the resonator mode of a single-sided resonator and the atom or atoms. Thus, even in the case of a single physical system, the optical response of the coupled system formed of the resonator mode and physical system significantly changes in accordance with the state of the physical system. Therefore, this phenomenon can be utilized for observing a single physical system.

However, a specific method of using the response of the coupled system formed of the resonator mode and each physical system to read a plurality of quantum bits existing in a single resonator is not known so far.

BRIEF SUMMARY OF THE INVENTION

In accordance with an aspect of the invention, there is provided a quantum bit reading apparatus comprising: a resonator having a resonator mode; a material included in the resonator and containing n physical systems (n is an integer not less than 2), each of the physical systems having at least five energy states, a first transition of each physical system between $|g>_i$ and $|e1>_i$ resonating in the resonator mode, and $|0>_i$ and $|1>_i$ representing quantum bits, where the five energy states of each physical system i (i is a natural number not more than n) are expressed by $|0>_i$, $|1>_i$, $|g>_i$, $|e1>_i$ and $|e2>_i$ in increasing order of energy; a first generation unit configured to generate first pulse light and second pulse light that resonate in a second transition between $|g>_i$ and $|e2>_i$ and a third transition between $|1>_i$ and $|e2>_i$, respectively; a first control unit configured to control the first pulse light and the second pulse light to make the first pulse light and the second pulse light temporally overlap each other to obtain third light formed of the first pulse light and the second pulse light, a state of the third light being shifted from a first state in which a first intensity of the first pulse light is higher than a second intensity of the second pulse light, to a second state in which the second intensity is higher than the first intensity; a first emission unit configured to emit the third light to each physical system i; a second generation unit configured to generate observation light to be coupled to the resonator mode; an introducing unit configured to introduce the observation light to the resonator from an outside thereof; a reading unit configured to read one of the quantum bits by measuring a third intensity of at least one of reflected light of the observation light and transmitted light of the observation light; a second control unit configured to control, after the one quantum bit is read, the first pulse light and the second pulse light to make the first pulse light and the second pulse light temporally overlap each other to obtain fourth light formed of the first pulse light and the second pulse light, a state of the fourth light being shifted from the second state to the first state; and a second emission unit configured to emit the fourth light to each physical system i.

DETAILED DESCRIPTION OF THE INVENTION

A quantum bit reading device and quantum bit reading methods according to an embodiment and examples of the embodiment will be described in detail with reference to the accompanying drawings. In the embodiment and examples thereof, like reference numbers denote like elements, and duplication of description is omitted.

The quantum bit reading device and quantum bit reading methods of the embodiment and examples can read individual quantum bits that exist in a resonator and each comprise a single physical system (a single atom, ion, etc.), by detecting significant changes in the intensity of sufficiently intensified light.

Before describing in detail the quantum bit reading device and quantum bit reading methods of the embodiment and examples, a description will be given of a mechanism for individually reading quantum bits that exist in a resonator and each comprise a single physical system, by detecting significant changes in the intensity of sufficiently intensified light.

In the embodiment and examples, the phenomenon is utilized in which the reflection spectrum and transmission spectrum of a system obtained by coupling a physical system contained in a resonator to the resonator mode are significantly changed when the state of the physical system is changed by the coupling.

Figure 1:
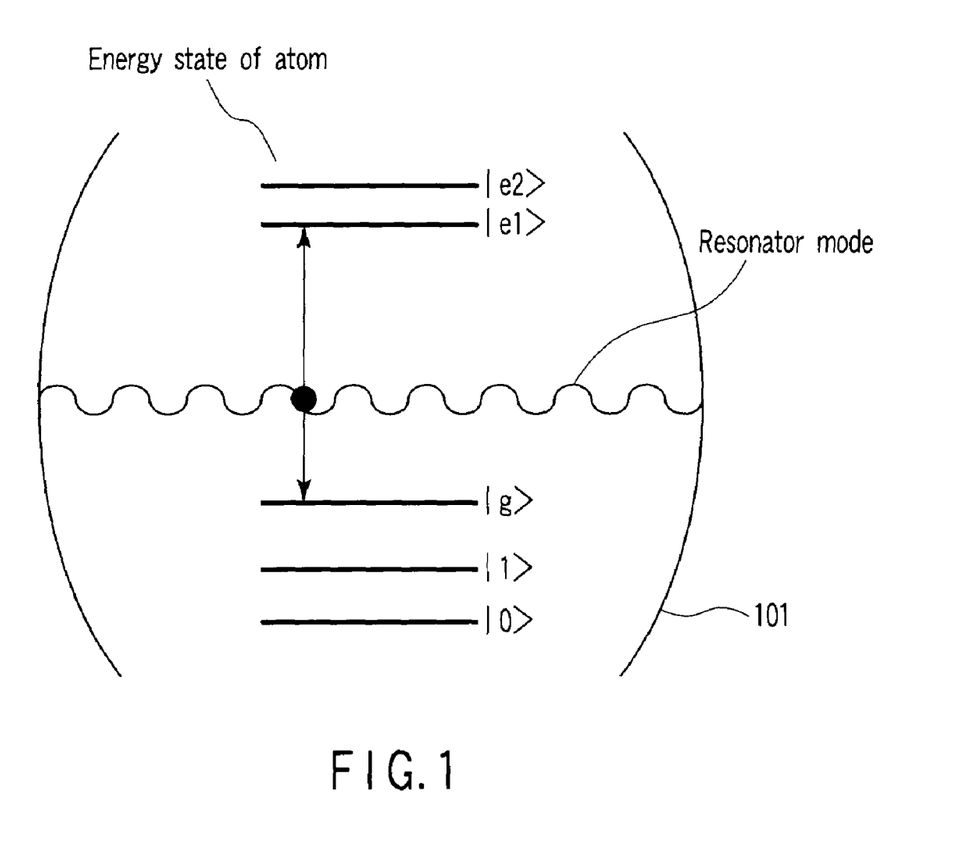
FIG. 1 is a view useful in explaining the energy states of an atom and resonator modes in a resonator.

Referring first to FIG. 1, a description will be given of the energy states of an atom (hereinafter, a physical system, such as an atom, ion, molecule, quantum dot, will be referred representatively to as an "atom") contained in a resonator 101. FIG. 1 is a schematic view illustrating energy states. In FIG. 1, |0>, |1>, |g>, |e1> and |e2> represent energy states arranged in the increasing order, and assume that a transition between |g> and |e1> is resonating with the resonator mode of a resonator 101. The resonator 101 has a resonator mode that is designed to resonate with, for example, a transition (corresponding to the transition between |g> and |e1> in the example of FIG. 1) between one of the states into which the electron state of $^3H_4$ in a $Pr^{3+}$ ion is split by hyperfine structure split, and one of the states into which the electron state of $^1D_2$ in the $Pr^{3+}$ ion is split by hyperfine structure split.

Figure 2A:
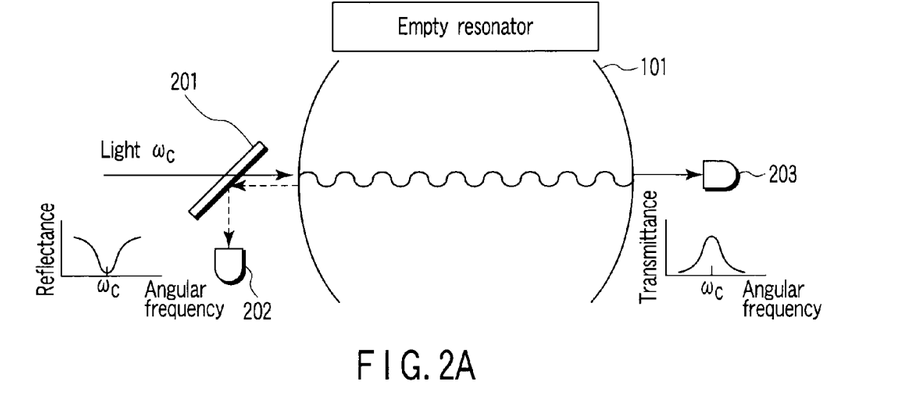
FIGS. 2A to 2C are views illustrating changes in reflection spectrum and transmission spectrum due to changes in the state of a resonator mode/atom coupled system.
Figure 2B:
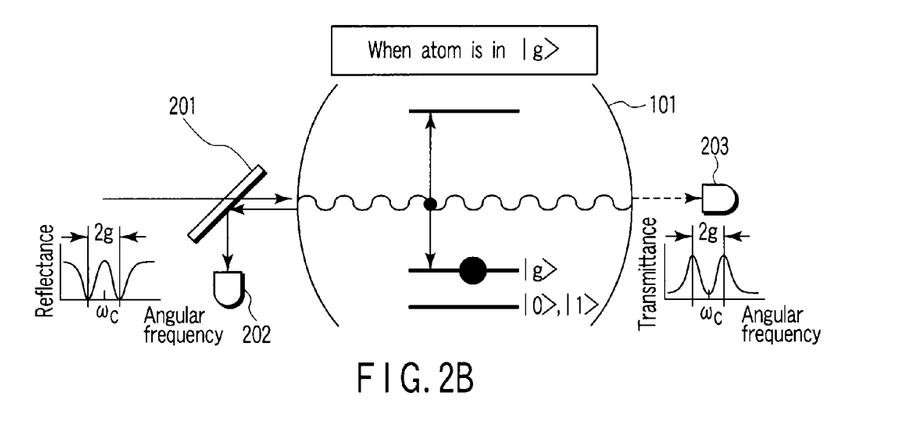
Figure 2C:
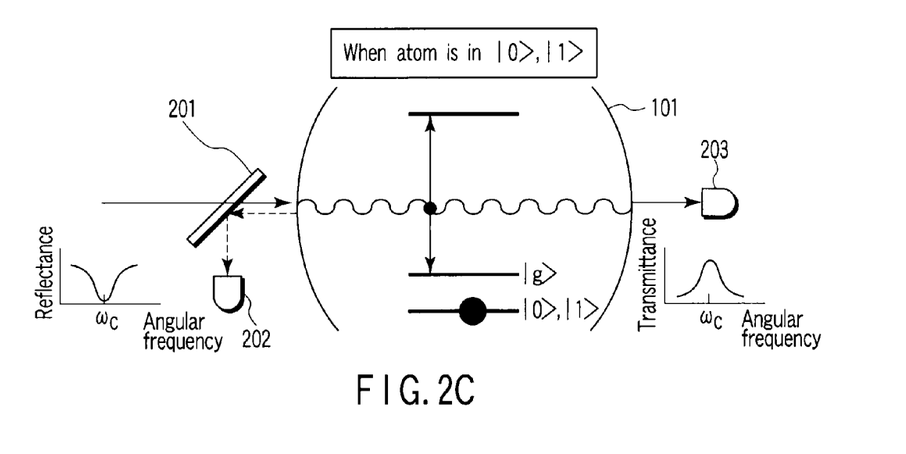

Referring then to FIGS. 2A, 2B and 2C, a description will be given of the reflection spectrum and transmission spectrum of a system (hereinafter referred to as the resonator-mode/atom coupled system) obtained by coupling the resonator mode and atom, which are obtained when the resonator contains no atoms, when a single atom in the resonator is in the state |g>, and when the single atom is in the state |0> or |1>.

A beam splitter 201 allows light from a light source to transmit therethrough, and reflects light from the resonator 101 and guides it to a photodetector 202.

Photodetectors 202 and 203 detect the light reflected from and transmitted through the resonator 101, respectively.

The case where the resonator contains no atoms will be described (FIG. 2A). In this case, light (with angular frequency $\omega_c$) that resonates with the resonator mode is introduced to the resonator 101 with the space mode adjusted to the resonator mode. If the rate of optical loss due to absorption or scattering of light by a mirror incorporated in the resonator 101, or a medium, if any, that fills the resonator, is low with respect to the resonance width (dissipation rate) determined from the reflectance of the mirror and the resonator length, the reflectance of light is substantially zero, and almost no light is reflected, namely, the transmittance is substantially 1, and hence almost all light is transmitted. At this time, if the frequency of the reflected light is swept near frequency $\omega_c$, the reflectance spectrum exhibits a dip of substantially zero at $\omega_c$, and the transmission spectrum exhibits a peak of substantially 1 at $\omega_c$, as is shown in FIG. 2A. In the embodiment and examples described below, the term "frequency" indicates an angular frequency if adjective "angular" is added or a numerical value of "×2π" is specified. In the other cases, it merely expresses "frequency."

The case where the state of an atom is |g> will be described (FIG. 2B). This case corresponds to the case where the state of a single atom contained in the resonator at a location at which the atom resonates with the resonator mode of the resonator is |g>, i.e., where the state of a single atom is related to a transition which is resonant with the resonator mode. When light of angular frequency $\omega_c$ enters the resonator-mode/atom coupled system, the transmittance of light is substantially zero, and almost no light is transmitted, whereas the reflectance is substantially 1, and almost all light is reflected. If the frequency of incident light is swept near angular frequency $\omega_c$, the transmission spectrum exhibits two peaks at the lower and higher frequency sides around $\omega_c$, and the distance of the two peaks is about twice the coupling constant g that indicates the magnitude of coupling of the resonator mode and atom, as is shown in FIG. 2B. The peak split of the transmission spectrum is called vacuum Rabi splitting or normal mode splitting. At this time, light of angular frequency $\omega_c$ has almost no transmission intensity between the two peaks, and is therefore little transmitted. In contrast, if the frequency of incident light is swept near angular frequency $\omega_c$, the reflection spectrum exhibits two dips at the lower and higher frequency sides about $\omega_c$, and the distance of the two dips is about twice the coupling constant g, as is shown in FIG. 2B. At this time, light of angular frequency $\omega_c$ has a high reflectance between the two dips, and is reflected at a reflectance of substantially 1.

The case where the state of an atom is |0> or |1> will be described (FIG. 2C). This case corresponds to the case where the state of a single atom contained in the resonator at a location at which the atom resonates with the resonator mode of the resonator is |0> or |1>, i.e., where the state of a single atom is other than the two states related to a transition which is resonant with the resonator mode. In this case, the resonator-mode/atom coupled system exhibits the same reflection spectrum and the same transmission spectrum as the resonator containing no atoms (FIG. 2A).

As described above referring to FIGS. 2A, 2B and 2C, the reflection spectrum and transmission spectrum drastically change depending upon whether the state of the atom is |g>, or |0> or |1>.

If the coupling constant g of the resonator mode and atom, the phase relaxation rate γ related to a transition of an atom that resonates with the resonator mode, and the dissipation rate κ of the resonator satisfy the following expression, it is considered that changes in reflection spectrum and transmission spectrum depending upon the state of the atom can be observed clearly.

$$g^2/(\kappa\gamma) > 1 \qquad (1)$$

However, if in the expression (1), g<κ and γ is a low value, the spectrum of transmitted light may well have, at the center of the convex curve, a narrow dip with a transmittance of substantially 0, and the spectrum of reflected light may well have, at the center of the dip, a spike with a peak of a reflectance of substantially 1, concerning the spectra shown in FIG. 2B.

As described above, in the resonator-mode/atom coupled system, the reflectance and/or transmittance of the coupled system with respect to light with a certain frequency is significantly changed depending upon whether the atom is in a state related to a transition which is resonant with the resonator mode, even if the atom is a single atom. This change may be able to be utilized for reading the state of the atom, i.e., a quantum bit. Further, if the intensity of incident light used for reading is increased, changes in reflected and/or transmitted light sufficient to measure may be able to be obtained.

On the other hand, transmitted light obtained when light of a certain angular frequency is introduced to the resonator-mode/atom coupled system can have a plurality of intensities, if a large number of atoms are contained in the coupled system, if they are in states related to transitions which is resonant with the resonator mode, and if the intensity of the incident light is high. It is known that this causes a phenomenon called optical bistability properties (see Phys. Rev. A56, 3262 (1997)). In this case, if the intensity of the incident light is too high, a solution that causes a symmetrical peak to be formed around the angular frequency $\omega_c$ of the incident light is obtained as a solution related to an angular-frequency-dependent output light intensity distribution. Therefore, if the intensity of the incident light is too high, when the output light intensity is measured with the angular frequency of the input light swept near $\omega_c$, whether the atom is in a state related to a transition which is resonant with the resonator mode may not be able to be detected as a significant change in the intensity of reflected or transmitted light at $\omega_c$.

However, in the case of a single atom, it is known that even if the intensity of incident light is high, split appears (see Cavity Quantum Electrodynamics, edited by P. R. Berman (Academic Press, Inc., San Diego, 1994), pp. 396-399). Therefore, when reading the quantum state of a single atom, i.e., a quantum bit, it can be read as a significant change in the intensity of transmitted or reflected light, even if light of a high intensity is used as input light.

Figure 3:
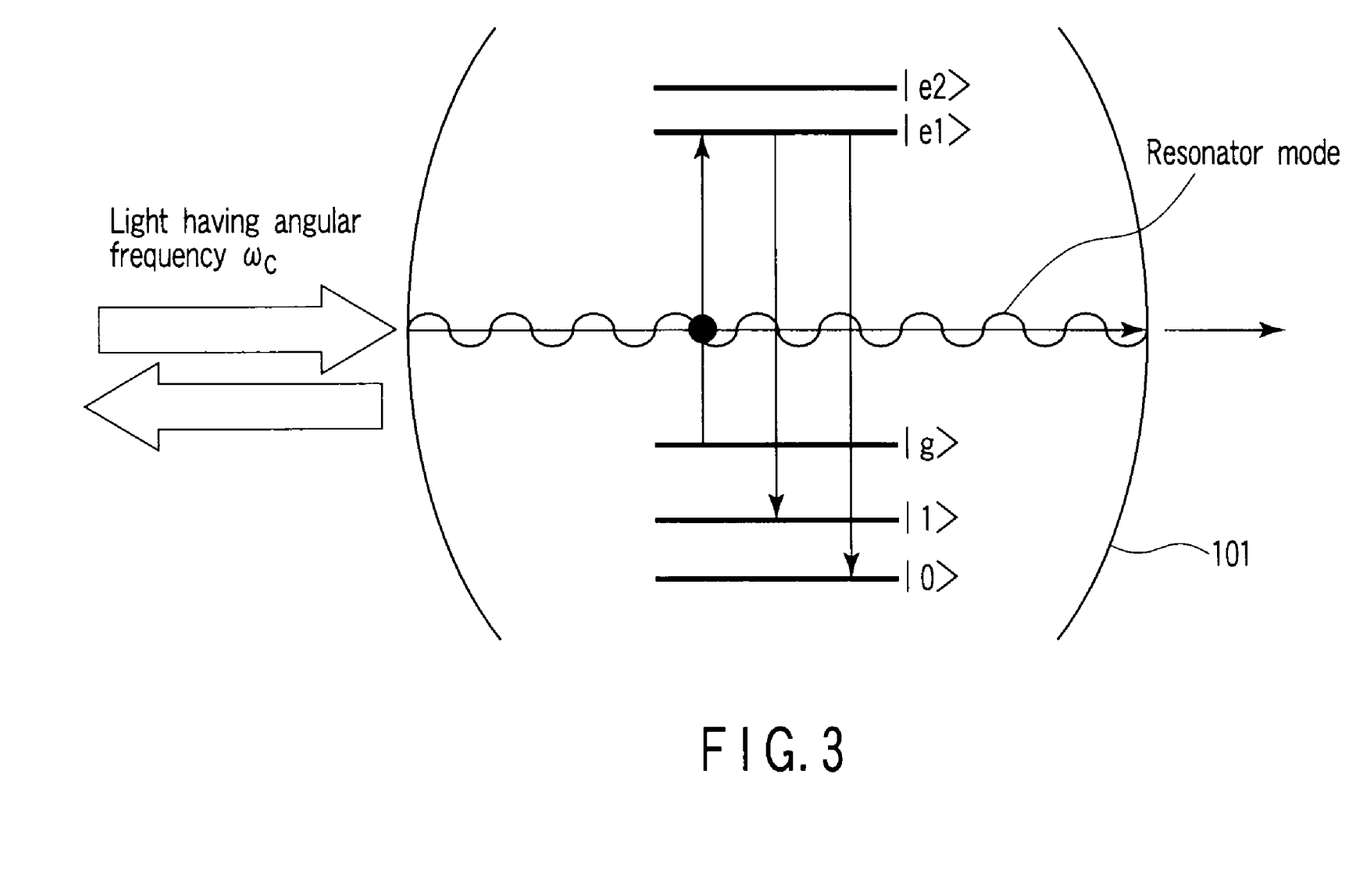
FIG. 3 is a view useful in explaining a case where the state of an atom is changed by a photon in a resonator mode.

Referring to FIG. 3, a change in the state of an atom will be described.

Assume here that high-intensity light of angular frequency $\omega_c$ is introduced to a resonator-mode/atom coupled system in which an atom is in the state of $|g>$. Although the greater part of the light is reflected from the surface of the resonator, the remaining part enters the resonator. The higher the intensity of the incident light, the higher the light intensity in the resonator. In this case, if the atom assumes a lower one of the energy states related to a transition which is resonant with the resonator mode, i.e., assumes the state $|g>$, it may be excited by the light in the resonator to thereby assume $|e1>$, and then relaxed to the state $|0>$ or $|1>$.

In the embodiment, when light is introduced to the resonator-mode/atom coupled system to observe the state of an atom contained therein, the observation time $T_m$ for which the input of the light is continued is set shorter than the lifetime $T_e$ of the higher one of the energy states of the atom related to a transition which is resonant with the resonator mode, and longer than the inverse number of twice the coupling constant g, i.e., $1/(2\times g)$. Namely, the following expression is satisfied:

$$1/(2\times g)<T_m<T_e \quad (2)$$

Since a longer time than the duration $T_e$ of the state $|e1>$ is required to excite the atom from the state $|g>$ to the state $|e1>$ and then relax the atom to the state $|0>$ or $|1>$, if the expression (2) is satisfied, a change in the state of the atom via the state $|e1>$ can be avoided during observation.

Further, to observe changes in a transmittance spectrum or a reflectance spectrum of a frequency width about twice the coupling constant g, an observation time of about it is necessary to $1/(2\times g)$ or more is required. The expression (2) satisfies this condition, too.

Namely, if the expression (2) is satisfied, the state of the atom, i.e., the quantum bit, can be read without changing the state. The other reason why the quantum state of the atom can be read without being changed is that the state of a material wanted to be finally read as the quantum bit is its eigenstate, and observation is performed to read its eigenvalue. In other words, the state of the material to be finally read is not a superposed state (e.g., $\alpha|0>+\beta|1>$, $\alpha\neq 0$, $\beta\neq 0$), but an eigenstate (e.g., $\alpha|0>$ or $\beta|1>$) and observation is performed to read its eigenvalue.

A description will now be given of a method of reading an $i^{th}$ quantum bit (quantum bit i) from a resonator containing a plurality of atoms serving as quantum bits, assuming that the atoms can have the energy states shown in FIGS. 1 and 3.

Firstly, pulse light 1 and pulse light 2, which resonate with a transition between $|g>i$ and $|e2>_i$ of an atom i (corresponding to the quantum bit i) and a transition between $|1>_i$ and $|e2>_i$ of the atom i, respectively, are applied to the atom i, made temporally overlap each other so that the state of light is shifted from the state in which the intensity of pulse light 1 is higher than that of pulse light 2, to the state in which the intensity of pulse light 2 is higher than that of pulse light 1. The selection of the $i^{th}$ atom is realized by discriminating this atom from the other atoms spatially or in the frequency domain, i.e., by adjusting the laser-beam application position or angular frequency. Further, since even atoms of the same kind have slightly different transition energy levels, depending upon their positions in a solid, they can be discriminated from each other in frequency.

This light application causes a physical process called adiabatic passage, thereby changing $|1>_i$ to $|g>_i$. Namely, when the physical system is in the state $|1>_i$, it is changed to $|g>_i$, whereas when it is in the state $|0>_i$, it does not change. During this change, the atom changes, kept in a state (called a dark state) in which $|1>_i$ and $|g>_i$ are superposed. At this time, the atom is not excited to $|e2>_i$. Further, in this case, population movement due to optical pumping via the excitation to $|e2>i$ cannot be utilized instead of the adiabatic passage. This is because in optical pumping, when relaxing the state of the atom from $|e2>_i$ to a lower level, $|e2>_i$ is not reliably changed to $|g>_i$, but may be changed to $|0>_i$ (if the initial state is $|1>_i$), or to $|1>_i$ (if the initial state is $|0>_i$).

Subsequently, light of angular frequency $\omega_c$ that resonates with the resonator mode is applied to the resonator in accordance with the spatial mode of the resonator mode for a time shorter than the lifetime of the state $|e1>$ of the atom, and longer than the inverse number of twice the coupling constant g of the atom and resonance mode, i.e., $1/(2\times g)$. At least the intensity of the resultant reflected light or of the resultant transmitted light is measured, and it is determined from the measurement value whether the atom is in the state $|g>_i$.

When the rate of optical loss due to absorption or scattering of light by a mirror incorporated in the resonator, or a medium, if any, that fills the resonator, is low with respect to the resonance width (dissipation rate) determined from the reflectance of the mirror and the resonator length, if the reflectance of light is substantially 1, and the transmittance is substantially 0, the atom i is in the state $|g>_i$ as shown in FIG.

2B, and if the reflectance of light is substantially 0, and the transmittance is substantially 1, the atom i is not in the state $|g>_i$ as shown in FIG. 2C.

If it is observed that the atom i is not in the $|g>_i$, it is determined that the atom i, i.e., quantum bit i, was in the state $|0>_i$. Namely, the atom i was in the state $|0>_i$ that is not changed to $|g>_i$ even by the above-mentioned adiabatic passage.

In contrast, if it is observed that the atom is in the $|g>_i$, it is determined that the atom 1, i.e., quantum bit i, was in the state $|1>_i$. Namely, the atom i was in the state $|1>_i$ that is changed to $|g>_i$ by the above-mentioned adiabatic passage.

Thus, the $i^{th}$ quantum bit value can be read. Namely, in this example, it can be detected whether the $i^{th}$ quantum bit assumes the state $|0>i$ or $|1>_i$.

In addition, adiabatic passage other than the above-mentioned one can be realized to read the value of the $i^{th}$ quantum bit. In this case, instead of the operation for changing $|1>_i$ to $|g>_i$, a similar operation is executed using, for example, pulse light 2 that resonates with a transition between $|0>_i$ and $|e2>_i$, and if it is observed that the atom i is in the $|g>_i$, it is determined that the atom i was in the state $|0>_i$.

After this reading process, it is necessary to change the state of the atom i to a state that is not related to a transition which is resonant with the resonator mode, so as not interfere with the reading of the next quantum bit. To this end, pulse light 1 and pulse light 2 are applied to the atom i, made temporally overlap each other so that the state of light is shifted from the state in which the intensity of pulse light 2 is higher than that of pulse light 1, to the state in which the intensity of pulse light 1 is higher than that of pulse light 2. As a result, if the atom i is initially in the state $|g>_i$, it is shifted to $|1>_i$ by adiabatic passage. Namely, the state of the atom i expressing the $i^{th}$ quantum bit i is returned to the original state assumed before reading the $i^{th}$ quantum bit. This enables any once read quantum bit to be read again.

In general, however, a once read quantum bit is not read again. Therefore, it is not always necessary to return the atom 1 to its original state. The state $|g>_i$ may be changed to $|0>_i$ by adiabatic passage using two pulse light beams that resonate with a transition between $|g>_i$ and $|e2>_i$, and a transition between $|0>_i$ and $|e2>_i$. Alternatively, light that resonates with a transition between $|g>_i$ and $|e2>_i$ or between $|g>_i$ and $|e1>i$ is applied to the atom i, thereby exciting the atom i to $|e2>_i$ or $|e1>_i$ and changing, by spontaneous emission, the state of the atom i to $|0>_i$ or $|1>_i$, if the initial state of the atom i is $|g>_i$.

The reason why $|e2>$ is used as an upper level for adiabatic passage, instead of $|e1>$, is to avoid an unintentional state of an atom caused when the higher-energy one ($|e1>$) of the states related to a transition which is resonant with the resonator mode is used. Namely, when $|e1>$ is used, the resonator mode is excited by strong coupling of the resonator mode and atom that occurs in accordance with a change in the state of the atom, whereby a photon having an angular frequency corresponding to the resonator mode becomes to exist, and is absorbed by the atom, resulting in the unintentional state of the atom.

After the above-described successive operations are executed on the atom i, the next atom, i.e., the $(i+1)^{th}$ atom, is read and subjected to the same operations to read the next quantum bit. Similarly, quantum bits are sequentially read. Thus, in the embodiment, a plurality of quantum bits, each of which is formed of a single physical system, can be individually read by detecting significant changes in the intensity of sufficiently intensified light.

Figure 4:
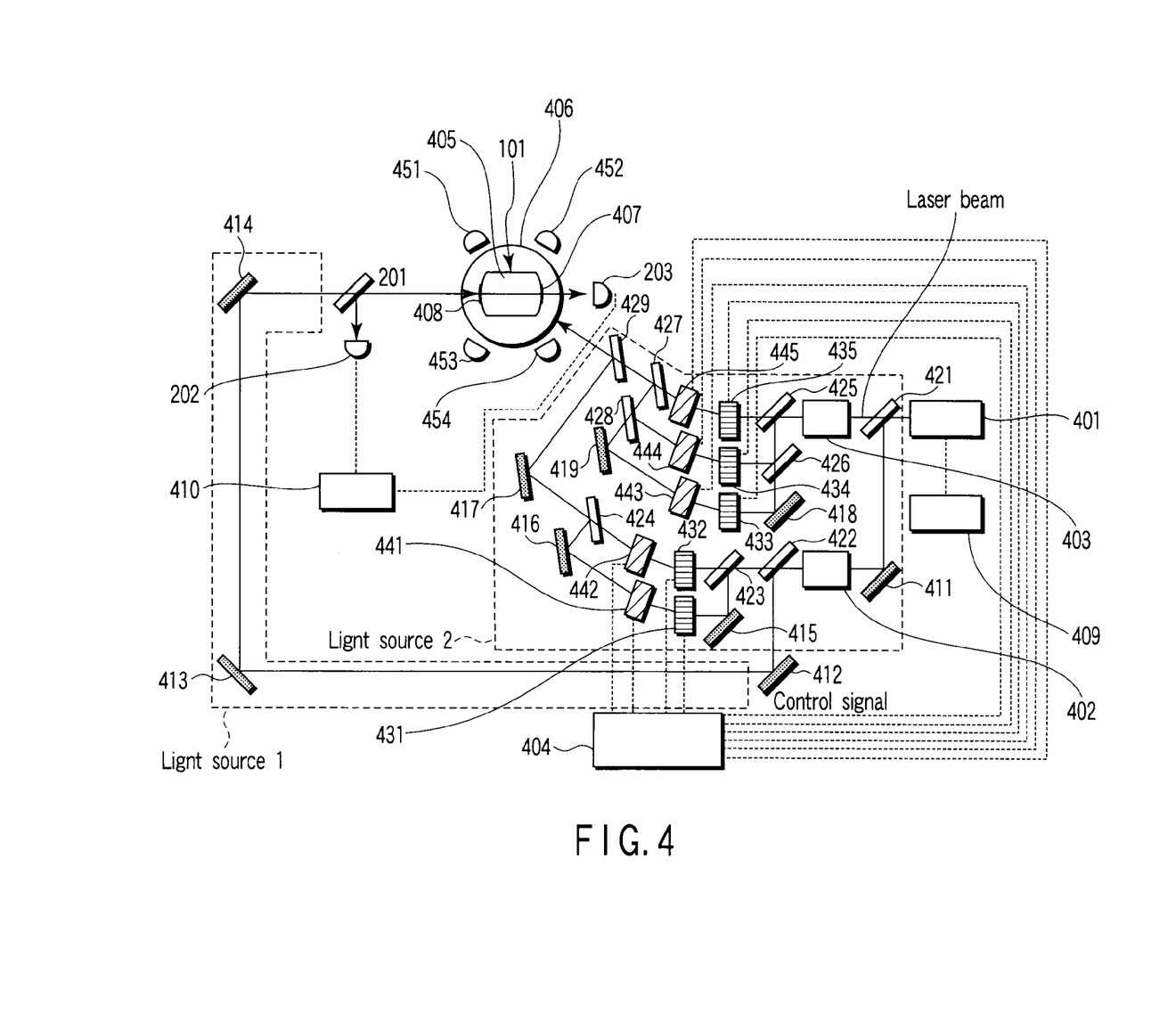
FIG. 4 is a block diagram illustrating a quantum bit reading device according to an embodiment.

Referring then to FIG. 4, a description will be given of a quantum bit reading apparatus that employs the above-described quantum bit reading method.

As shown in FIG. 4, the quantum bit reading apparatus comprises a light source 1, light source 2, controller 404, photodetectors 202 and 203, crystal 405, cryostat 406, ultra high reflectance mirror 407, laser beam controller 409, and quantum bit determination unit 410. Note that the light source 2 and photodetectors 451 to 454 are used in another embodiment described later. The photodetectors 451 to 454 each include a highly efficient collection system, and detect a weak single light beam, generated by the resonator 101, with high sensitivity and high efficiency. The photodetectors 451 to 454 are of higher sensitivity and efficiency than the photodetectors 202 and 203.

The light source 1 guides, to the resonator 101, the light generated by an argon-ion laser excited ring dye laser 401, using beam splitters 421, 422 and 201, mirrors 411 to 414 and narrowing system 402. The light source 2 guides, to the resonator 101, the light generated by the argon-ion laser excited ring dye laser 401, using beam splitters 421 to 429, mirrors 411 and 415 to 419, and narrowing systems 402 and 403. Each of the beam splitters 421 to 429 splits light into reflected light and transmitted light, or combines reflected light and transmitted light, thereby guiding the resultant light to the next stage. Each of the mirrors 411 to 419 reflects light and guides it to the next stage. The narrowing systems 402 and 403 narrow incident light. Specifically, the systems 402 and 403 narrow light to spectral widths of 1 kHz and 100 kHz, respectively. Frequency-setting acousto-optic effect elements 431 to 435 adjust the frequency of incident light. A pulse-forming/timing control acousto-optic effect element 441 controls the time of pulse forming from incident light or the time of outputting incident light. The controller 404 controls the frequency-setting acousto-optic effect elements 431 to 435, and pulse-forming/timing control acousto-optic effect elements 441 to 445, thereby controlling the light emitted from the light source 2. The controller 404 performs control to generate pulse light for performing the above-described adiabatic passage, and to generate light that resonates with a transition between $|g>_i$ and $|e2>_i$ or between $|g>_i$ and $|e1>_i$.

The crystal 405 is, for example, $Pr^{3+}:Y_2SiO_5$ crystal employed in the examples described later. However, the material is not limited to crystal. It is sufficient if the material brings out the function and advantage of the embodiment.

The cryostat 406 is used to hold its interior extremely cold. In the examples described later, its interior is held at 1.5K. The ultra high reflectance mirror 407 reflects light at an extremely high reflectance.

The laser beam controller 409 performs control for generating light of angular frequency $\omega_c$ that resonates with the resonator mode and is supplied to the light sources 1 and 2.

The quantum bit determination unit 410 measures the intensities of reflected light and transmitted light detected by the photodetectors 202 and 203, respectively, and computes the reflectance and transmittance of the resonator 101 based on the beforehand detected intensity of the incident light of the resonator 101, and the measured intensities of the reflected light and transmitted light, thereby determining whether the quantum bit is in the state $|0>$ or $|e1>$.

The light $\omega_c$ shown in FIGS. 2A, 2B and 2C is generated by the light source 1. A laser beam is generated by the ring dye laser 401, then partially reflected by the beam splitter 412, reflected by the mirror 411, narrowed into a spectral width of 1 kHz by the narrowing system 402, partially reflected by the beam splitter 422, and reflected by the mirrors 412, 413 and 414. As a result, the reflected light is guided to the beam splitter 201.

Examples of the invention will now be described.

EXAMPLE 1

In the quantum bit reading apparatus and method employed in example 1, a $Pr^{3+}$ ion contained in $Pr^{3+}$:$Y_2SiO_5$ crystal, which is obtained by replacing $10^{-5}\%$ $Y^{3+}$ ions in $Y_2SiO_5$ with $Pr^{3+}$ ions, is used as a quantum bit. This crystal has a size of about 10 mm ×10 mm×10 mm, and is provided with a mirror of an ultra high reflectance on its surface. Thus, a resonator structure is provided. The resonator mode of the resonator is designed such that the resonator structure resonates with a transition (approx. 494.73×$2\pi$THz) of a $Pr^{3+}$ ion between $^3H_4$ and $^1D_2$. The mode west radius is approx. 1 µm. The crystal is installed in the cryostat and held at 1.5K.

Figure 5:
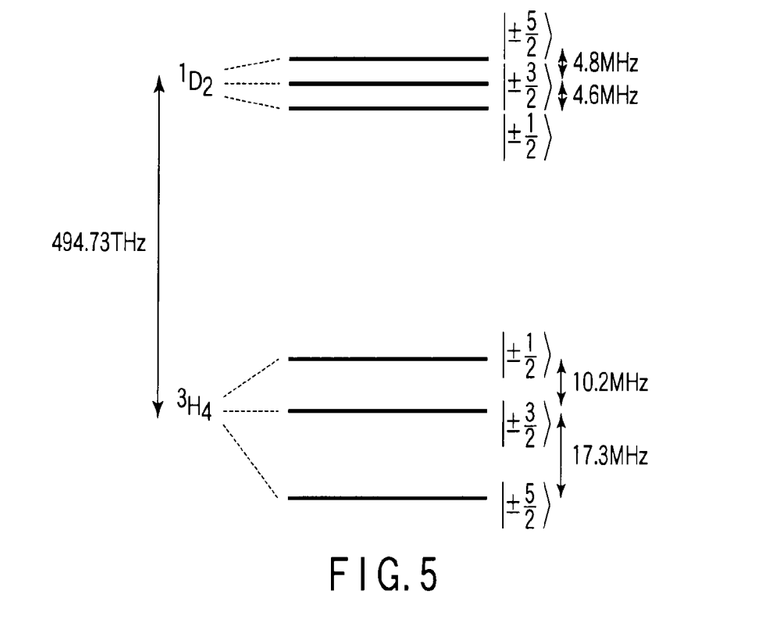
FIG. 5 is a view illustrating the energy states of a $Pr^{3+}$ ion contained in $Pr^{3+}:Y_2SiO_5$ crystal employed in examples.

The $Pr^{3+}$ ion contained in $Pr^{3+}$:$Y_2SiO_5$ crystal can assume the energy states shown in FIG. 5. $^3H_4$ has three energy states (|±5/2>, |±3/2> and |±1/2> in the increasing order), and $^1D_2$ also has three energy states (|±1/2>, |±3/2> and |±5/2> in the increasing order). The three energy states of $^3H_4$, i.e., |±5/2>, |±3/2> and |±1/2>, will hereinafter be referred to as |0>, |1> and |g>, respectively. Similarly, the three energy states of $^1D_2$, i.e., |±1/2>, |±3/2> and |±5/2>, will hereinafter be referred to as |e1>, |e2> and |e3>, respectively.

Figure 6:
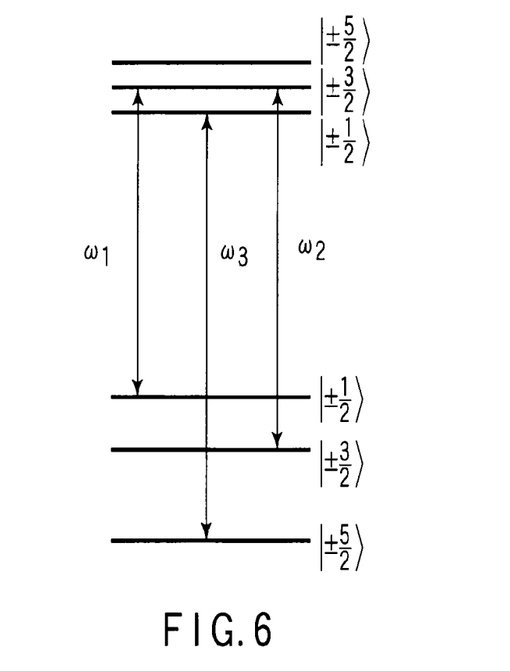
FIG. 6 is a view illustrating the transition angular frequencies of an ion selected by three light beams having angular frequencies $\omega_1$, $\omega_2$ and $\omega_3$ in the examples.

The light source 2 shown in FIG. 4 is used. In the light source 2, light is obtained by narrowing, to 100 kHz, a laser beam from the argon-ion laser excited ring dye laser 401, using a narrowing system 402 as a feedback system comprising a reference resonator, acousto-optic effect element and electro-optic effect element (which are not shown in FIG. 4), and then stabilizing the absolute frequency of the narrowed laser beam. Further, the thus-obtained light is divided and shifted in frequency by the acousto-optic effect elements 433 to 435, whereby three beams having the following angular frequencies $\omega_1$, $\omega_2$ and $\omega_3$ and shown in FIG. 6 are prepared:

$\omega_1 = \omega_c + 4.6\text{ MHz} \times 2\pi$ $\omega_2 = \omega_c + (10.2\text{ MHz} + 4.6\text{ MHz}) \times 2\pi$ $\omega_3 = \omega_c + (10.2\text{ MHz} + 17.3\text{ MHz}) \times 2\pi$ where $\omega_c$ is the frequency of the resonator mode, and is a preset angular frequency near 494.68 ×$2\pi$THz (approx. 606.035 nm) located at an end of an inhomogeneous broadening corresponding to the transition of a $Pr^{3+}$ ion in the crystal between $^3H_4$ and $^1D_2$.

Further, in the light source 2, light is obtained by narrowing, to 1 kHz, a laser beam from the argon-ion laser excited ring dye laser 401, using a narrowing system 402 as a feedback system comprising a reference resonator, acousto-optic effect element and electro-optic effect element (which are not shown in FIG. 4), and then stabilizing the absolute frequency of the narrowed laser beam. Further, the thus-obtained light is divided and shifted in frequency by the acousto-optic effect elements 431 and 432, whereby two beams having a spectral width of 1 kHz, which can be swept near angular frequencies $\omega_1$ and $\omega_2$, are prepared.

Firstly, in this example, to set each single ion system, the crystal 101 with a resonator and the light source 2 are used to measure the transitional angular frequencies of each ion used as a quantum bit.

Specifically, a plurality of photodetectors 451 to 454 are located around the crystal 101 to enable a photon emitted from a $Pr^{3+}$ ion contained in the crystal to be efficiently detected.

In this state, two beams $\omega_1$ and $\omega_2$, included in the three light beams $\omega_1$, $\omega_2$ and $\omega_3$ having a spectral width of 100 kHz, are formed into respective pulse strings with a pulse width of 2 µs and a pulse interval (cycle) of 4 µs. The beams $\omega_1$ and $\omega_2$ and the other light beam $\omega_3$ as continuous light are simultaneously are applied to the resonator, with the beams $\omega_1$ and $\omega_2$ deviated from each other by $\pi$, whereby the ions other than an ion having transition angular frequencies as shown in FIG. 6 are shifted, within the accuracy of the laser spectra width, to states where they do not react to any of the three light beams. Immediately after applying these three light beams, beams $\omega_1$ and $\omega_3$ having a spectral width of 100 kHz are applied to shift, to the state |1>, the ion having the transition angular frequencies shown in FIG. 6.

Subsequently, light with a spectral width of 1 kHz is swept around $\omega_2$ within a range of 200 kHz at a sweeping rate of $5 \times 10^6$ Hz/s (first sweeping). During the first sweeping, if at least one of the four photodetectors 451 to 454 detects a photon, the angular frequency $\omega_2$ (t1) of the applied light is temporarily recorded upon detection of the photon, and successively, light with the spectral width of 1 kHz is swept around $\omega_1$ within the range of 200 kHz at the sweeping rate of $5 \times 10^6$ Hz/s (second sweeping). During the second sweeping, if at least one of the four photodetectors 451 to 454 detects a photon, the angular frequency $\omega_1$ (t2) of the applied light is temporarily recorded upon detection of the photon. After that, light with the spectral width of 1 kHz is again swept around $\omega_2$ within the range of 200 kHz at the sweeping rate of $5 \times 10^6$ Hz/s (third sweeping). During the third sweeping, if at least one of the four photodetectors 451 to 454 detects a photon, the angular frequency $\omega_2$ (t3) of the applied light is temporarily recorded upon detection of the photon. At this time, if $\omega_2$ (t1)=$\omega_2$ (t3), a pair of transition angular frequencies $\omega_1$ (1) and $\omega_2$ (1) of a certain single ion is obtained, assuming that $\omega_2$ (1)=$\omega_2$ (t1)=$\omega_2$ (t3), and $\omega_1$ (1)=$\omega_1$ (t2). This frequency pair is recorded. In contrast, if $\omega_2$ (t1)≠$\omega_2$ (t3), the three light beams $\omega_1$, $\omega_2$ and $\omega_3$ are again applied to shift, to the state |1>, the ion having the transition angular frequencies shown in FIG. 6, and to obtain a pair of transition angular frequencies of a certain single ion by frequency sweeping using light beams $\omega_1$ and $\omega_2$ having the spectral width of 1 kHz. These successive operations are executed until a pair of transition angular frequencies $\omega_1$ (1) and $\omega_2$ (1) of the $1^{st}$ ion is obtained.

After obtaining the transition angular frequency pair of the $1^{st}$ ion is obtained, the above-described successive operations, beginning with the application of the three light beams $\omega_1$, $\omega_2$ and $\omega_3$, are performed to obtain a pair of transition angular frequencies of another ion. As a result, a pair of transition angular frequencies of the $2^{nd}$ ion is obtained. Thus, pairs of transition angular frequencies of a plurality of ions are sequentially detected. However, it should be noted that during the first sweeping for detecting a pair of transition angular frequencies of a new ion, only when angular frequencies differing from those previously determined as the transition angular frequencies of the detected ions are obtained, they are temporarily recorded, and the second sweeping is performed.

As described above, the transition angular frequency pairs of a plurality of ions are obtained. If no photon is detected during any one of the first to third sweeping processes, the operation is restarted beginning with the application of three light beams. The transition angular frequency pairs of the ions thus obtained with the accuracy of 1 kHz are set as ($\omega_1$ (j), $\omega_2$ (j)), j representing the $j^{th}$ ion.

In this example, to minimize the time required for operating the quantum state of each ion, i.e., to perform the operation using pulse light of a relatively narrow pulse width (pulse light having a spectral width corresponding to the pulse width), two ions having transition angular frequencies separate from each other by 50 kHz or more are used as quantum bits. In the example, assuming that the $1^{st}$ ion having the angular frequencies $\omega_1$ (1) and $\omega_2$ (1), and the $2^{nd}$ ion having the angular frequencies $\omega_1$ (2) and $\omega_2$ (2) satisfy the condition, they are used as quantum bits 1 and 2.

A description will be given of the quantum bit reading apparatus and method employed in the example.

Figure 7:
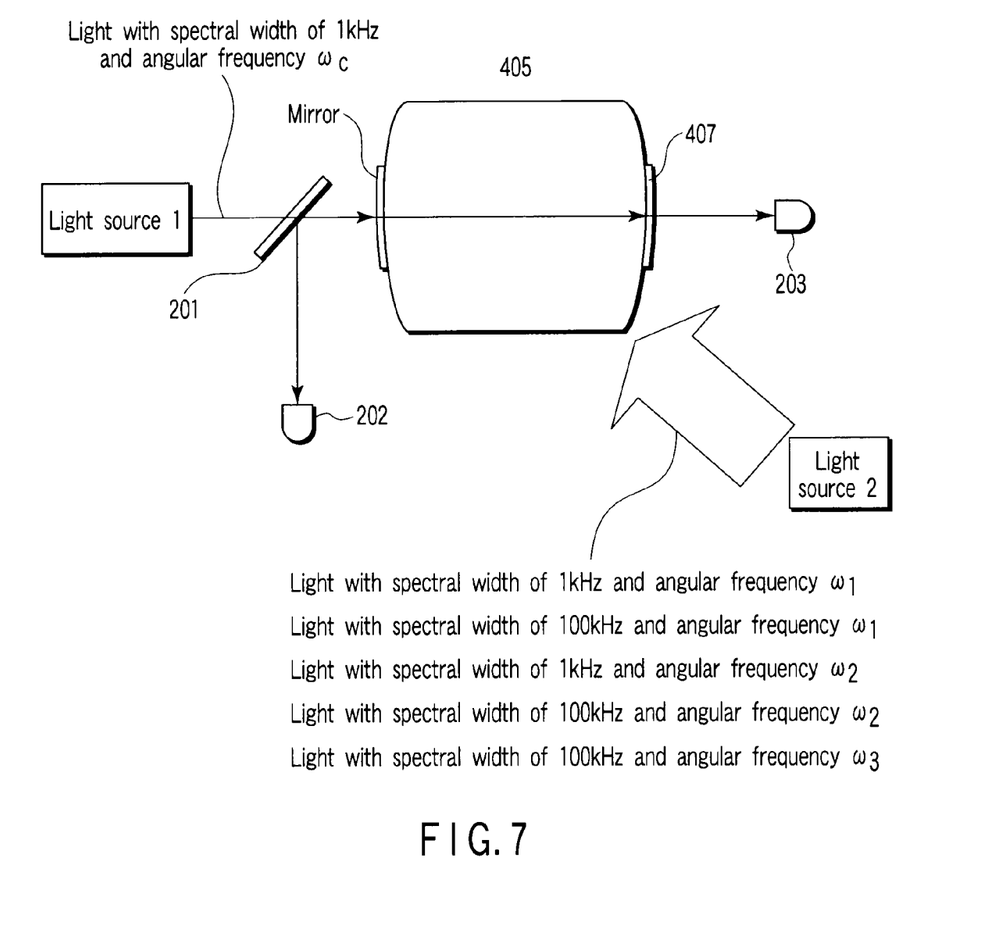
FIG. 7 is a view useful in explaining light and a photodetector used for quantum bit reading in the examples.

As shown in FIG. 7, a beam splitter 201 is opposed to one of the two mirrors 407 provided on both sides of crystal 405 that contains ions detected by measuring /transition angular frequencies with an accuracy of 1 kHz. Through the beam splitter 201, light $\omega_c$ narrowed to a spectral width of 1 kHz can be guided from the light source 1 to the resonator-attached crystal 405. Further, a photodetector 202 for detecting the intensity of the light reflected from the crystal 405, and a photodetector 203 for detecting the intensity of the light passing therethrough. The light source 2 can emit light of angular frequency $\omega_3$ with a spectral width of 100 kHz, and can emit each of light beams of angular frequencies $\omega_1$ and $\omega_2$ with spectral widths of 100 kHz and 1 kHz.

Firstly, three light beams $\omega_1$, $\omega_2$ and $\omega_3$ are applied to an ion to shift, to |1>, the state of the ion that has, within the spectral widths of the beams, the transition angular frequencies shown in FIG. 6.

Subsequently, light beams of $\omega_1$ (2) and $\omega_2$ (2), which are in the form of pulse strings having a pulse width of 2 μm and a pulse interval (cycle) of 4 μm and deviated by π from each other, are applied to the crystal 405, thereby shifting the state of the ion from |1> to |0>. Assuming that quantum bits are represented by the two states |1>and |0>, quantum bit 1 can be set as |1>, and quantum bit 2 can be set as |0>. A description will be given of how to read quantum bits 1 and 2, using the quantum bit reading apparatus and method of the embodiment.

Light beams of angular frequencies $\omega_1$ (1) and $\omega_2$ (1) shaped into a Gaussian type with a half-width of 20 μs are output from the light source 2 to the crystal, with the light beam $\omega_2$ (1) delayed by 20 μs with respect to the light beam $\omega_1$ (1), thereby changing the state of quantum bit 1 from |1> to |g> utilizing adiabatic passage.

In this state, the light source 1 emits, to the resonator-attached crystal 405, light of angular frequency $\omega_c$ with the space mode of this light adjusted to the resonator mode of the crystal 405, and the intensities of the light reflected therefrom and the light transmitted therethrough are measured by the photodetectors 202 and 203, respectively. The duration of the incident light is set to 10 μs.

Assuming that the intensity of the incident light, the measured intensity of the reflected light, and the intensity of the transmitted light are $I_{in}$, $I_R(1)$, and $I_T(1)$, respectively, $I_R(1)/I_{in} \cong 1$ and $I_T(1)/I_{in} \cong 0$ are established, whereby quantum bit 1 is determined |1>.

After that, light beams of angular frequencies $\omega_1$ (1) and $\omega_2$ (1) shaped into the Gaussian type with the half-width of 20 μs are output from the light source 2 to the crystal, with the light beam $\omega_1$ (1) delayed by 20 μs with respect to the light beam $\omega_2$ (1), thereby returning the state of quantum bit 1 from |g> to |1> utilizing adiabatic passage.

Thereafter, light beams of angular frequencies $\omega_1$ (2) and $\omega_2$ (2) shaped into the Gaussian type with the half-width of 20 μs are output from the light source 2 to the crystal, with the light beam $\omega_2$ (2) delayed by 20 μs with respect to the light beam $\omega_2$ (2), thereby changing the state of quantum bit 2 from |1> to |g> utilizing adiabatic passage.

In this state, the light source 1 emits, to the resonator-attached crystal 405, light of angular frequency $\omega_c$ with the space mode of this light adjusted to the resonator mode of the crystal 405, and the intensities of the light reflected therefrom and the light transmitted therethrough are measured by the photodetectors 202 and 203, respectively. The duration of the incident light is set to 10 μs.

Assuming that the intensity of the incident light, the measured intensity of the reflected light, and the intensity of the transmitted light are $I_{in}$, $I_R(2)$, and $I_T(2)$, respectively, $I_R(2)/I_{in} << I_R(1)/I_{in}$ and $I_T(2)/I_{in} >> I_T(1)/I_{in}$ are established, whereby quantum bit 2 is determined not to be |1> but to be |0>.

The above-described series of reading operations is performed within a time, such as _b 100 ms, shorter than the relaxation times of an ion between the nuclear spin states (|±5/2>, |±5/2>, |1/2>) of the electron ground states of the ion.

The conditions employed in the examples enable a significant change to occur in reflected or transmitted light in accordance with the value of a quantum bit, i.e., the conditions facilitate reading, because the coupling constant (approx. 750 kHz (angular frequency)), the measurement time (10 μs) and the lifetime (approx. 200 μs) of the upper level state of an ion satisfy the previously mentioned expression (2), even though the quantum bit is formed of a single ion. Further, the conditions enable, after reading the quantum bit, the next quantum bit to be read correctly, since the state of the quantum bit is shifted to a state not involved in transition which is resonant with the resonator mode. Thus, a plurality of quantum bits can be read.

EXAMPLE 2

In example 2, the same devices as the resonator-attached crystal 405 and its peripheral devices employed in example 1 are used. Example 2 differs from example 1 in method. Specifically, in example 2, light of angular frequency $\omega_c$ is introduced to the resonator-attached crystal 405, and the intensities of the light reflected therefrom are measured to read quantum bit 1. After that, the state of quantum bit 1 is changed from |g> to another state. At this time, light $\omega_1$ (1) is sufficiently introduced from the light source 1 to the crystal to shift the state |g> to another state, utilizing excitation to |e2> and relaxation to |0> or |1>, instead of utilizing adiabatic passage based on two light beams of different wavelengths, as in example 1.

As described above, a plurality of quantum bits existing in a double-sided resonator and each formed of a single physical system can be individually read by detecting a significant change in the intensity of sufficiently intensified light, utilizing the phenomenon that the reflectance and transmittance of a coupled system that is formed of the resonator mode of the resonators and the single physical system (single atom, ion, etc.) is significantly changed in accordance with the state of the physical system, regardless of the intensity of incident light.

Additional advantages and modifications will readily occur to those skilled in the art. Therefore, the invention in its broader aspects is not limited to the specific details and representative embodiment and examples shown and described herein. Accordingly, various modifications may be made without departing from the spirit or scope of the general inventive concept as defined by the appended claims and their equivalents.

What is claimed is:

1. A quantum bit reading apparatus comprising:
a resonator having a resonator mode;
a material included in the resonator and containing n physical systems (n is an integer not less than 2), each of the physical systems having at least five energy states, a first transition of each physical system between $|g>_i$ and $|e1>_i$ resonating in the resonator mode, and $|0>_i$ and $|1>_i$ representing quantum bits, where the five energy states of each physical system i (i is a natural number not more than n) are expressed by $|0>_i$, $|1>_i$, $|g>_i$, $|e1>_i$ and $|e2>_i$ in increasing order of energy;
a first generation unit configured to generate first pulse light and second pulse light that resonate in a second transition between $|g>_i$ and $|e2>_i$ and a third transition between $|1>_i$ and $|e2>_i$, respectively;
a first control unit configured to control the first pulse light and the second pulse light to make the first pulse light and the second pulse light temporally overlap each other to obtain third light formed of the first pulse light and the second pulse light, a state of the third light being shifted from a first state in which a first intensity of the first pulse light is higher than a second intensity of the second pulse light, to a second state in which the second intensity is higher than the first intensity;
a first emission unit configured to emit the third light to each physical system i;
a second generation unit configured to generate observation light to be coupled to the resonator mode;
an introducing unit configured to introduce the observation light to the resonator from an outside thereof;
a reading unit configured to read one of the quantum bits by measuring a third intensity of at least one of reflected light of the observation light and transmitted light of the observation light;
a second control unit configured to control, after the one quantum bit is read, the first pulse light and the second pulse light to make the first pulse light and the second pulse light temporally overlap each other to obtain fourth light formed of the first pulse light and the second pulse light, a state of the fourth light being shifted from the second state to the first state; and
a second emission unit configured to emit the fourth light to each physical system i.

2. The apparatus according to claim 1, wherein when measuring the third intensity, the reading unit adjusts a time $T_m$ of the measuring to satisfy $T_g < T_m < T_e$, $T_g$ being an inverse number of twice a coupling constant between the resonator mode and each physical system, or $T_g = 1/(2 \times g)$, $T_e$ being a lifetime of an excited state $|e1>$ of each physical system.

3. The apparatus according to claim 1, further comprising a cryostat which holds an interior thereof at a constant temperature, wherein the resonator and the material are included in the cryostat.

4. A quantum bit reading apparatus comprising:
a resonator having a resonator mode;
a material included in the resonator and containing n physical systems (n is an integer not less than 2), each of the physical systems having at least five energy states, a first transition of each physical system between $|g>_i$ and $|e1>_i$ resonating in the resonator mode, and $|0>_i$ and $|1>_i$ representing quantum bits, where the five energy states of each physical system i (i is a natural number not more than n) are expressed by $|0>_i$, $|1>_i$, $|g>_i$, $|e1>_i$ and $|e2>_i$ in increasing order of energy;
a first generation unit configured to generate first pulse light and second pulse light that resonate in a second transition between $|g>_i$ and $|e2>_i$ and a third transition between $|1>_i$ and $|e2>_i$, respectively;
a control unit configured to control the first pulse light and the second pulse light to make the first pulse light and the second pulse light temporally overlap each other to obtain third light formed of the first pulse light and the second pulse light, a state of the third light being shifted from a first state in which a first intensity of the first pulse light is higher than a second intensity of the second pulse light, to a second state in which the second intensity is higher than the first intensity;
a first emission unit configured to emit the third light to each physical system i;
a second generation unit configured to generate observation light to be coupled to the resonator mode;
an introducing unit configured to introduce the observation light to the resonator from an outside thereof;
a reading unit configured to read one of the quantum bits by measuring a third intensity of at least one of reflected light of the observation light and transmitted light of the observation light; and
a second emission unit configured to emit, to each physical system i, light that resonates in one of the first transition and the second transition, after the one quantum bit is read.

5. The apparatus according to claim 4, wherein when measuring the third intensity, the reading unit adjusts a time $T_m$ of the measuring to satisfy $T_g < T_m < T_e$, $T_g$ being an inverse number of twice a coupling constant between the resonator mode and each physical system, or $T_g = 1/(2 \times g)$, $T_e$ being a duration of an excited state $|e1>$ of each physical system.

6. The apparatus according to claim 4, further comprising a cryostat which holds an interior thereof at a constant temperature, wherein the resonator and the material are included in the cryostat.

7. A quantum bit reading method comprising:
preparing a resonator having a resonator mode;
preparing a material included in the resonator and containing n physical systems (n is an integer not less than 2), each of the physical systems having at least five energy states, a first transition of each physical system between $|g>_i$ and $|e1>_i$ resonating in the resonator mode, and $|0>_i$ and $|1>_i$ representing quantum bits, where the five energy states of each physical system i (i is a natural number not more than n) are expressed by $|0>_i$, $|1>_i$, $|g>_i$, $|e1>_i$ and $|e2>_i$ in increasing order of energy;
generating first pulse light and second pulse light that resonate in a second transition between $|g>_i$ and $|e2>_i$ and a third transition between $|1>_i$ and $|e2>_i$, respectively;
controlling the first pulse light and the second pulse light to make the first pulse light and the second pulse light temporally overlap each other to obtain third light formed of the first pulse light and the second pulse light, a state of the third light being shifted from a first state in which a first intensity of the first pulse light is higher than a second intensity of the second pulse light, to a second state in which the second intensity is higher than the first intensity;
emitting the third light to each physical system i;
generating observation light to be coupled to the resonator mode;
introducing the observation light to the resonator from an outside thereof;
reading one of the quantum bits by measuring a third intensity of at least one of reflected light of the observation light and transmitted light of the observation light;

controlling, after the one quantum bit is read, the first pulse light and the second pulse light to make the first pulse light and the second pulse light temporally overlap each other to obtain fourth light formed of the first pulse light and the second pulse light, a state of the fourth light being shifted from the second state to the first state; and emitting the fourth light to each physical system i.

8. The method according to claim 7, wherein when measuring the third intensity, a time $T_m$ of the measuring is adjusted to satisfy $T_g<T_m<T_e$, $T_g$ being an inverse number of twice a coupling constant between the resonator mode and each physical system, or $T_g=1/(2\times g)$, $T_e$ being a duration of an excited state $|e1>$ of each physical system.

9. The method according to claim 7, further comprising preparing a cryostat which holds an interior thereof at a constant temperature, wherein the resonator and the material are included in the cryostat.

10. A quantum bit reading method comprising:
preparing a resonator having a resonator mode;
preparing a material included in the resonator and containing n physical systems (n is an integer not less than 2), each of the physical systems having at least five energy states, a first transition of each physical system between $|g>_i$ and $|e1>_i$ resonating in the resonator mode, and $|0>_i$ and $|1>_i$ representing quantum bits, where the five energy states of each physical system i (i is a natural number not more than n) are expressed by $|0>_i$, $|1>_i$, $|g>_i$, $|e1>_i$ and $|e2>_i$ in increasing order of energy;
generating first pulse light and second pulse light that resonate in a second transition between $|g>_i$ and $|e2>_i$ and a third transition between $|1>_i$ and $|e2>_i$, respectively;
controlling the first pulse light and the second pulse light to make the first pulse light and the second pulse light temporally overlap each other to obtain third light formed of the first pulse light and the second pulse light, a state of the third light being shifted from a first state in which a first intensity of the first pulse light is higher than a second intensity of the second pulse light, to a second state in which the second intensity is higher than the first intensity;
emitting the third light to each physical system i;
generating observation light to be coupled to the resonator mode;
introducing the observation light to the resonator from an outside thereof;
reading one of the quantum bits by measuring a third intensity of at least one of reflected light of the observation light and transmitted light of the observation light; and
emitting, to each physical system i, light that resonates in one of the first transition and the second transition, after the one quantum bit is read.

11. The method according to claim 10, wherein when measuring the third intensity, a time $T_m$ of the measuring is adjusted to satisfy $T_g<T_m<T_e$, $T_g$ being an inverse number of twice a coupling constant between the resonator mode and each physical system, or $T_g=1/(2\times g)$, $T_e$ being a duration of an excited state $|e1>$ of each physical system.

12. The method according to claim 10, further comprising preparing a cryostat which holds an interior thereof at a constant temperature, wherein the resonator the material are included in the cryostat.

* * * * *